(12) United States Patent
Yoshikawa

(10) Patent No.: US 7,402,006 B2
(45) Date of Patent: Jul. 22, 2008

(54) MANUFACTURING METHOD OF GEAR DEVICE

(75) Inventor: Hiroshi Yoshikawa, Kadoma (JP)

(73) Assignee: Koyo Seiko Co., Ltd., Osaka (JP)

( * ) Notice: Subject to any disclaimer, the term of this patent is extended or adjusted under 35 U.S.C. 154(b) by 546 days.

(21) Appl. No.: 11/196,316

(22) Filed: Aug. 4, 2005

(65) Prior Publication Data

US 2006/0027040 A1 Feb. 9, 2006

(30) Foreign Application Priority Data

Aug. 5, 2004 (JP) ............................. 2004-228829

(51) Int. Cl.
*B23F 13/00* (2006.01)
(52) U.S. Cl. .................. 409/2; 29/893.31; 29/893.1; 29/407.05; 409/5; 409/12; 409/15; 409/51; 409/61
(58) Field of Classification Search ................. 73/162; 29/893.31, 893.1, 407.05; 409/1, 2, 5, 12, 409/15, 26, 51, 61, 131, 132, 79, 80, 84, 409/133, 195; 451/47
See application file for complete search history.

(56) References Cited

U.S. PATENT DOCUMENTS

| 3,113,488 | A | * | 12/1963 | Davenport | ............... 409/15 |
| 4,611,956 | A | | 9/1986 | Kotthaus | |
| 5,279,174 | A | * | 1/1994 | Minegishi | ............... 74/458 |
| 5,502,882 | A | * | 4/1996 | Duta et al. | ........... 29/407.05 |
| 5,634,371 | A | * | 6/1997 | Duta et al. | ............... 73/162 |
| 5,836,076 | A | * | 11/1998 | Duta et al. | ............. 29/893.1 |
| 6,766,686 | B2 | * | 7/2004 | Greubel | ............... 73/162 |
| 2002/0017420 | A1 | | 2/2002 | Kinme et al. | |

FOREIGN PATENT DOCUMENTS

JP 2002-21943 A 1/2002

* cited by examiner

*Primary Examiner*—Daniel W Howell
(74) *Attorney, Agent, or Firm*—Birch, Stewart, Kolasch & Birch, LLP

(57) ABSTRACT

This method includes: a supporting process of supporting a worm wheel in a first supporting section of a supporting body; an engaging process of engaging a jig gear which corresponds to a worm with the worm wheel; a measuring process of measuring a distance between the centers of the worm wheel and the jig gear; a gear processing process of processing the worm based on the measured distance between the centers; and a supporting process of supporting the worm in a second supporting section of the supporting body after releasing the engagement between the worm wheel and the jig gear.

5 Claims, 5 Drawing Sheets

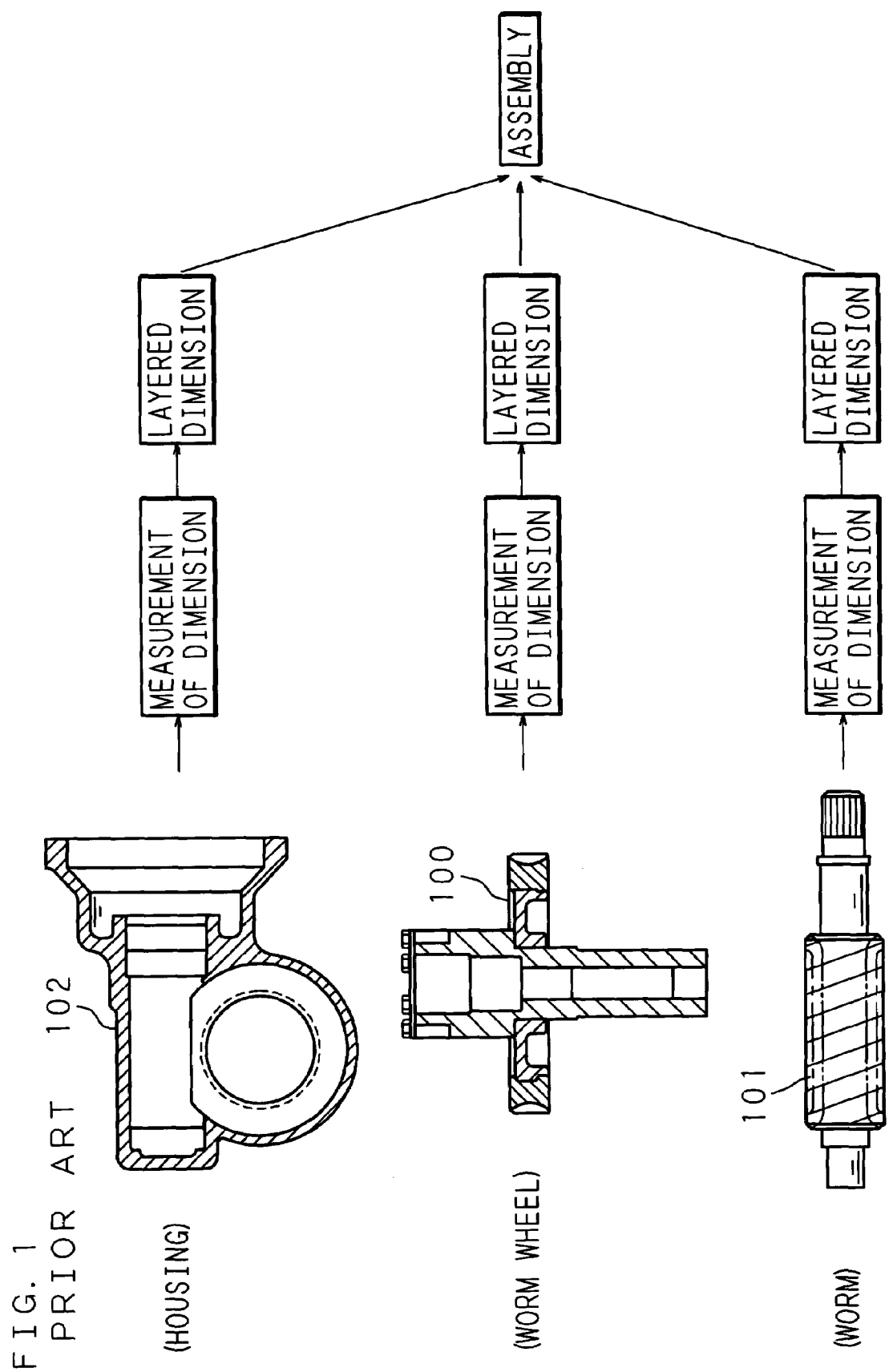

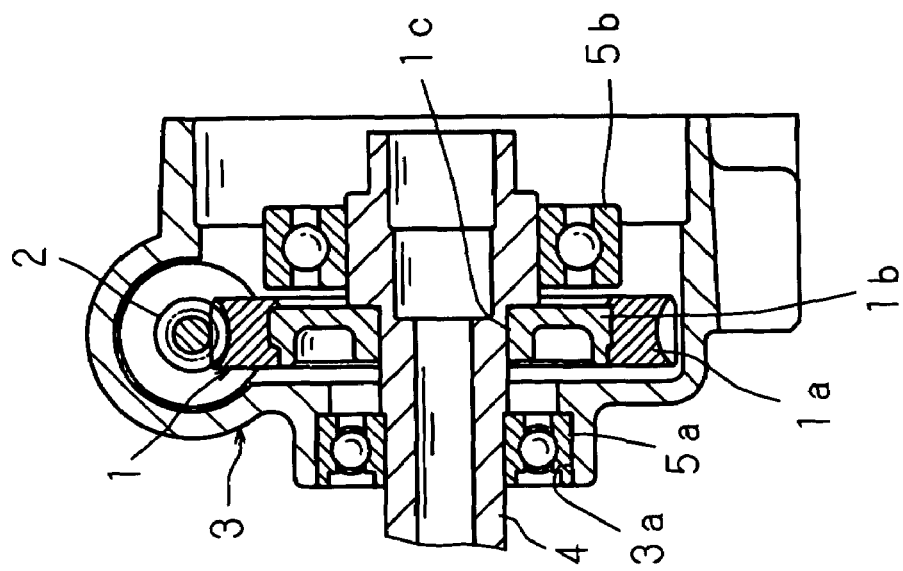
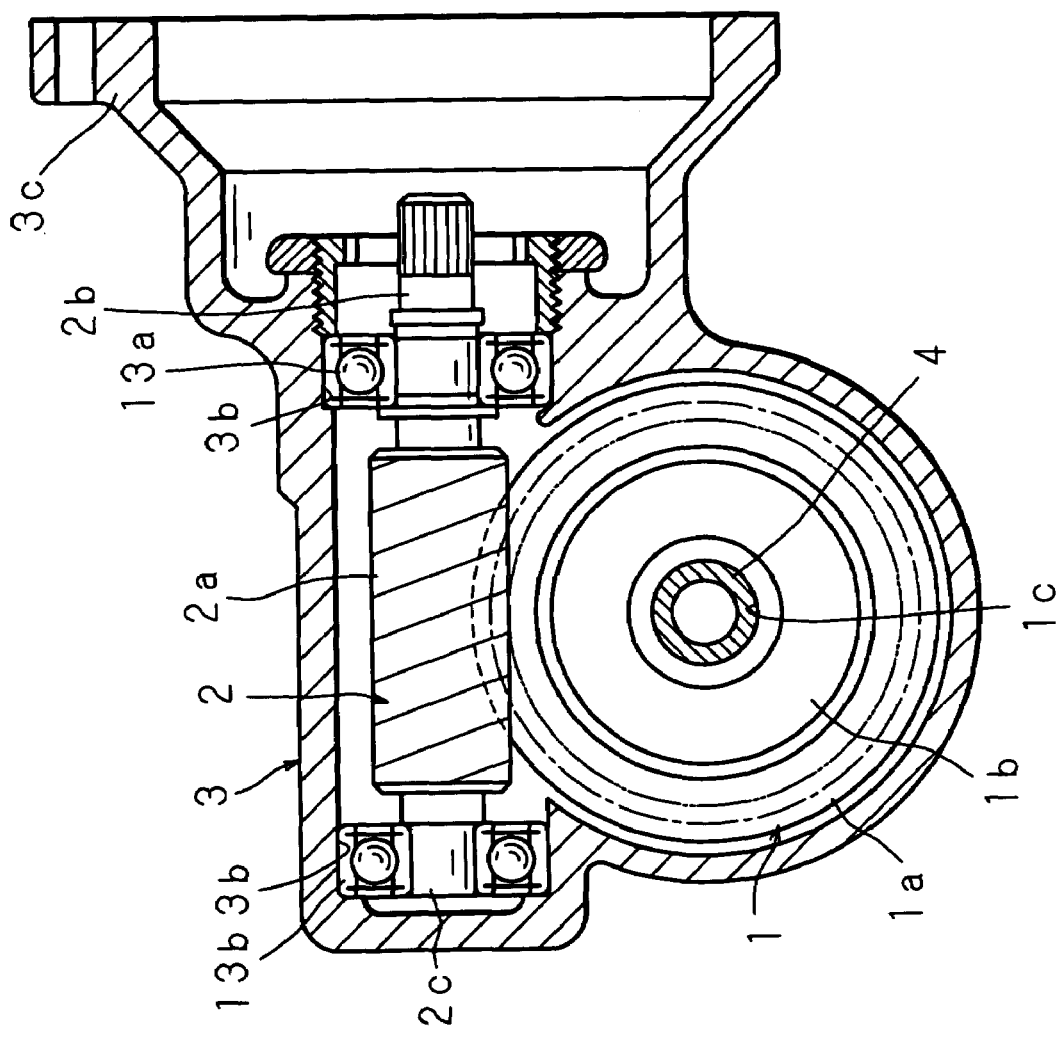

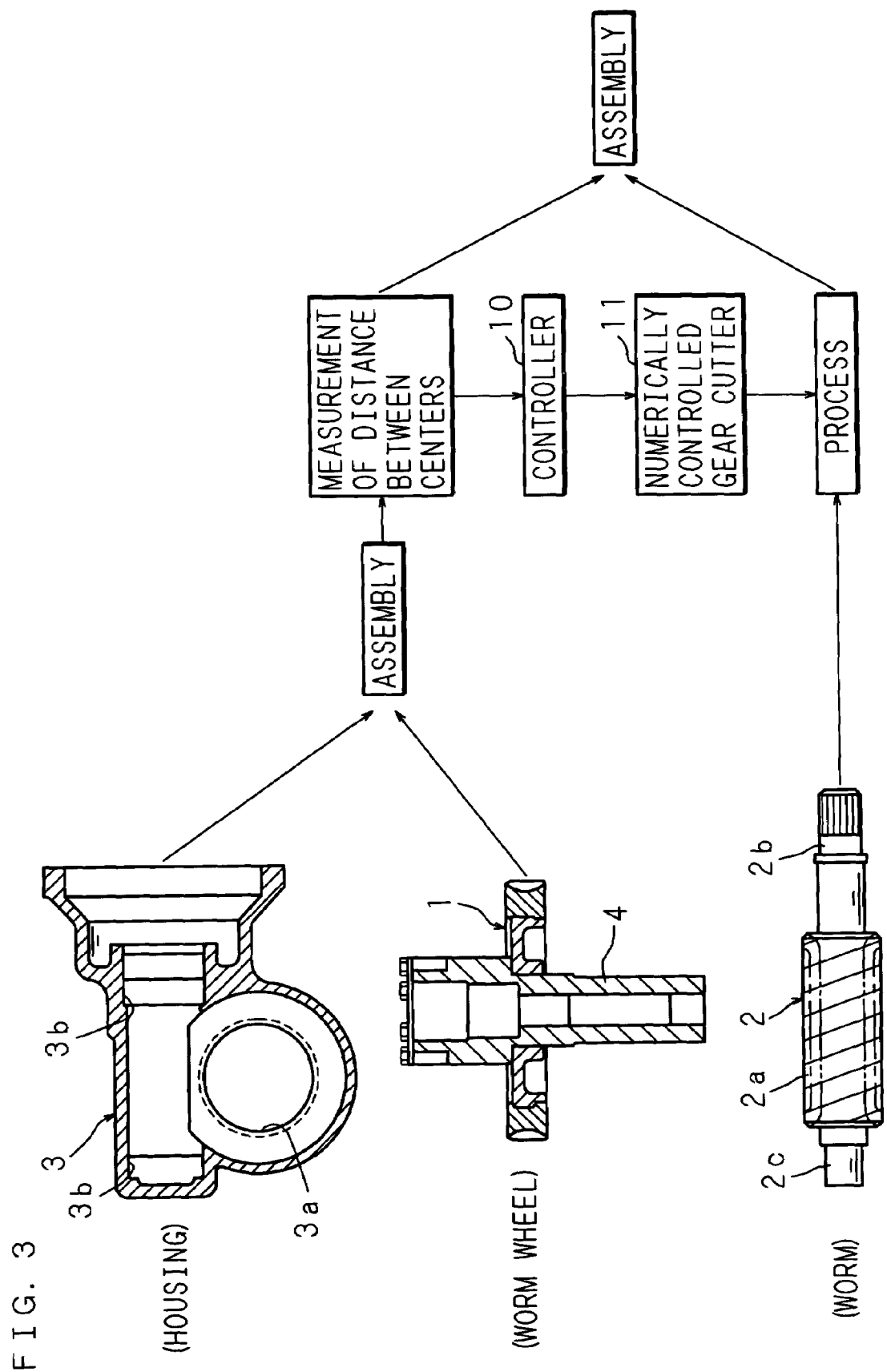

MANUFACTURING METHOD OF GEAR DEVICE

CROSS-REFERENCE TO RELATED APPLICATIONS

This Nonprovisional application claims priority under 35 U.S.C. §119(a) on Patent Application No. 2004-228829 filed in Japan on Aug. 5, 2004, the entire contents of which are hereby incorporated by reference.

BACKGROUND OF THE INVENTION

1. Field of the Invention

The present invention relates to a manufacturing method of a gear device for use in an electric power steering apparatus for a vehicle or the like.

2. Description of Related Art

An electric power steering apparatus for a vehicle includes an electric motor for assisting steering and a gear device which transmits a rotational force of the electric motor to steering means, and assists movement of the steering means corresponding to operation of a steering wheel by rotation of the electric motor, thereby reducing a driver's labor and burden for steering.

The gear device includes a worm interlockingly coupled to an output shaft of the electric motor via a shaft joint, a worm wheel engaged with the worm and connected to the steering means, and a housing for rotatably supporting and accommodating the worm and the worm wheel (for example, Japanese Patent Application Laid-Open No. 2002-21943).

The worm, having helical teeth integrally formed on an outer peripheral part of a right circular cylinder member made of metal material, is disposed so as to be intersected with the axis core of the worm wheel and is supported in the housing via a pair of rolling bearings.

The worm wheel is engaged with and fixed into a rotational shaft of the steering means and the rotational shaft is supported in the housing via the pair of rolling bearings.

The housing has a first supporting section into which the rolling bearing is fitted and in which the worm is rotatably supported, and a second supporting section into which the rolling bearing is fitted and in which the worm wheel is rotatably supported.

The worm and worm wheel of the gear device are combined so that any movement in each radial direction is not permitted; however, since there are dimensional errors in each processed worm, worm wheel, and housing, a backlash amount at the engagement part between the worm and the worm wheel varies from small to large when they are combined neglecting their dimensional errors. When the backlash amount is large, rattling noise is generated when steering, and the rattling noise leaks into an automobile compartment. Further, torque increases when the backlash amount is small, thus the worm and worm wheel cannot be smoothly rotated.

FIG. 1 is an explanatory view showing a layered assembly process of the gear device. Conventionally in order to have a proper backlash amount and torque in engagement parts between articles, processed worm wheel 100, worm 101, housing 102, and the like are classified into a plurality of dimension groups with respect to design dimensions so that a distance between the centers of the worm wheel 100 and worm 101 is set within an allowable range by selectively combining one set of the worm wheel 100, worm 101, and housing 102 from the thus-classified dimension groups (a so called layered assembly).

However, in the conventional gear devices, the worm wheel 100, worm 101, and housing 102 are individually measured and the layered assembly is then performed; and therefore, measurement errors generated at each measurement are accumulated when assembling; further, measurement errors due to the atmospheric temperature also largely affects. Consequently, there has been a problem in that the backlash amount and torque are not stable between articles. Further, stocks of products in process for layered assembly increase and the increased stocks cause high cost, and therefore, countermeasures are required.

BRIEF SUMMARY OF THE INVENTION

The present invention has been made with the aim of solving the above problem, and it is an object of the present invention to provide a manufacturing method of a gear device which can reduce cumulative errors due to measurement and reduce stocks of products in process.

A first aspect of the present invention is a manufacturing method of a gear device which includes a first gear, a second gear for engaging with the first gear, and a supporting body having a first supporting section for rotatably supporting the first gear and a second supporting section for rotatably supporting the second gear, the method comprising: a supporting process of supporting the first gear in the first supporting section; an engaging process of engaging a jig gear which corresponds to the second gear with the first gear; a measuring process of measuring a distance between the centers of the first gear and the jig gear by measuring means; a gear processing process of processing the second gear based on the distance between the centers measured by the measuring means; and a supporting process of supporting the second gear in the second supporting section after releasing the engagement between the first gear and the jig gear.

In the first aspect of the present invention, a processed first gear is supported in a first supporting section of a processed supporting body; one of the supporting body and the jig gear is shifted toward the direction that the distance between the centers becomes short to engage the first gear with the jig gear, whereby the distance between the centers of the first gear and the jig gear can be measured at the position where the backlash amount and torque of the engagement part becomes optimum. Based on the measured distance between the centers, in other words, based on the difference between the measured distance between the centers and a designed distance between the centers, a target processing by a numerically controlled gear cutter, for example, can be conducted on the second gear. In this case, when the measured distance between the centers is longer than the designed distance between the centers by +5 μm, an instruction signal that the distance between the centers becomes shorter than the designed distance between the centers by −5 μm is given to the numerically controlled gear cutter to conduct the target processing on the second gear so that the measured distance between the centers becomes equal to the designed distance between the centers. In the thus-processed second gear, when the second gear is supported in the second supporting section of the supporting body, the backlash amount and torque between the first gear and the second gear becomes the optimum dimension. Consequently, after one of the supporting body and the jig gear is shifted toward the direction that the distance between the centers becomes long to release the engagement between the first gear and jig gear, the second gear is supported in the second supporting section of the supporting body to engage the second gear with the first gear, whereby the backlash amount and the torque between the first gear and the second gear can be optimized and the backlash amount and the torque between the articles can become stable. Further, a supporting process of supporting the first gear in the supporting body, a measuring process, a processing process of the second gear, and a supporting process of supporting the second gear in the supporting body can be conducted in the same temperature environment; measurement errors due to the atmospheric temperature can be reduced.

A second aspect of the present invention is a manufacturing method of a gear device in which the jig gear has a cut off part to cut off a tooth body on one side thereof in a radial direction.

In the second aspect of the present invention, when the engagement between the jig gear and the first gear is released in a state that the jig gear is disposed in the second supporting section of the supporting body and the jig gear is engaged with the first gear, the jig gear can be shifted toward the direction that the distance between the centers becomes long by the cut off part of the jig gear without interfering the jig gear with the second supporting section, thereby releasing the engagement between the first gear and the jig gear easily.

According to the first aspect of the present invention, the distance between the centers is measured using the jig gear, the second gear is processed based on the measured distance between the centers, and such a second gear is incorporated, whereby the number of measurements can be reduced compared to the case performed by the layered assembly, cumulative errors due to the measurement can be reduced, and the backlash amount and the torque between articles can become stable. Further, the layered assembly is not performed, and therefore, stocks of products in process can be reduced.

According to the second aspect of the present invention, the jig gear can be shifted toward the direction that the distance between the centers becomes long by the cut off part of the jig gear without interfering the jig gear with the second supporting section, thereby releasing the engagement between the first gear and the jig gear easily.

The above and further objects and futures of the invention will more fully be apparent from the following detailed description with accompanying drawings.

BRIEF DESCRIPTION OF THE SEVERAL VIEWS OF THE DRAWINGS

FIG. 1 is an explanatory view showing a layered assembly process of a conventional gear device;

FIGS. 2A and 2B are sectional views showing a configuration of a gear device according to the present invention;

FIG. 3 is a schematic view showing processes of a manufacturing method of the gear device according to the present invention;

DETAILED DESCRIPTION OF THE INVENTION

Figure 4:
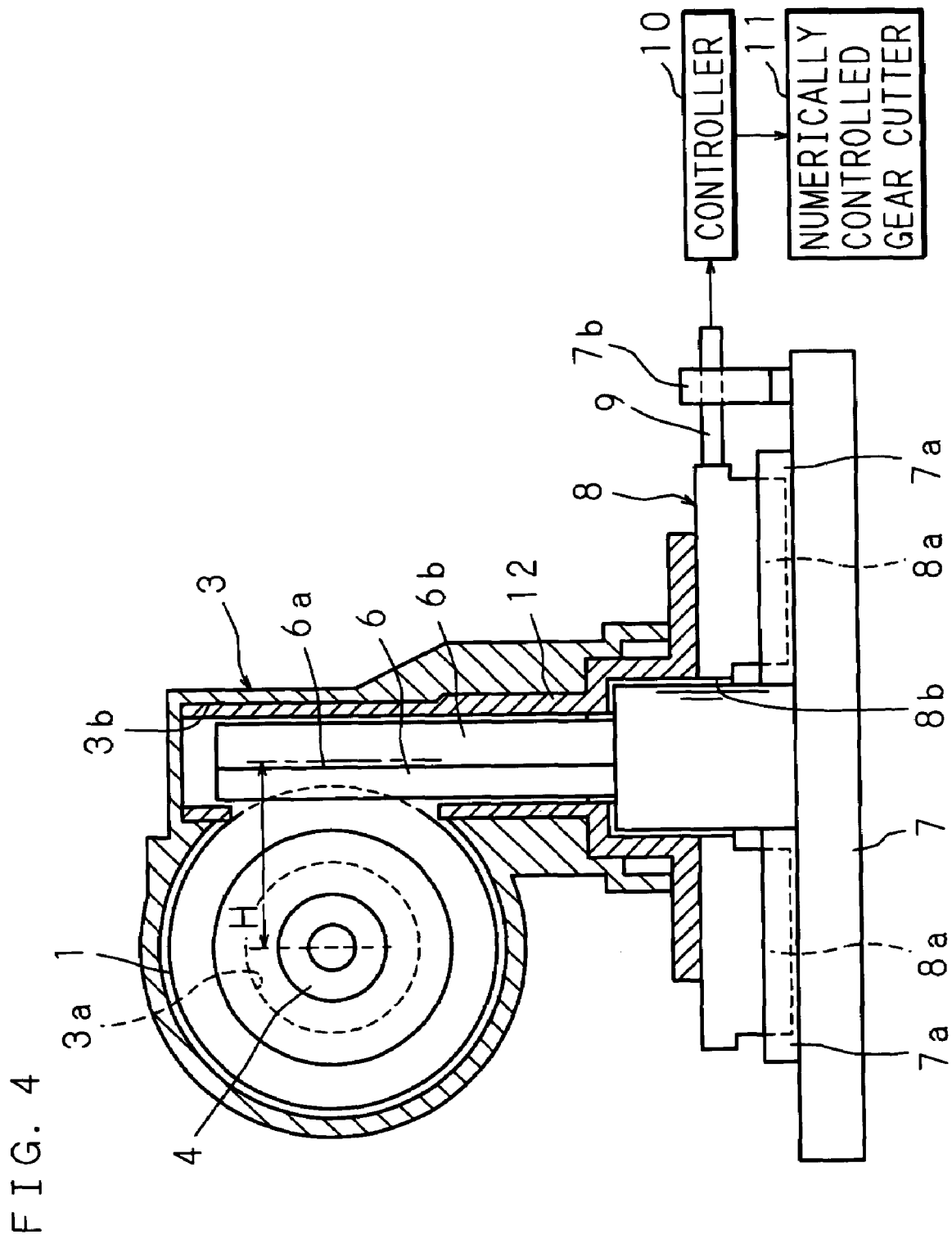
FIG. 4 is a sectional view showing a state of manufacture midstream of the manufacturing method of the gear device according to the present invention.

The following description will explain in detail the present invention based on the drawings illustrating some embodiments thereof. FIGS. 2A and 2B are sectional views showing a configuration of a gear device according to the present invention and FIG. 3 is a schematic view showing processes of a manufacturing method of the gear device.

The gear device includes a worm wheel 1 serving as a first gear, a worm 2 serving as a second gear, and a supporting body 3 serving as a housing having a first supporting section 3a for rotatably supporting and accommodating the worm wheel 1 and a second supporting section 3b for rotatably supporting and accommodating the worm 2 perpendicular to the axis line of the worm wheel 1.

The worm wheel 1 is composed of a circular tooth body 1a made of synthetic resin and having teeth on its outer peripheral part and a core member 1b made of metal, coupled inside the circular tooth body 1a and having an engagement hole 1c at its central part. A rotational shaft 4 is engaged with and fixed into the engagement hole 1c of the core member 1b. The worm wheel 1 and the rotational shaft 4 are conducted by machining. Further, the rotational shaft 4 is fitted into rolling bearings 5a and 5b which are provided on both sides of the worm wheel 1.

The worm 2 has a helical tooth part 2a on its central part and shaft members made of metal having shaft parts 2b and 2c on both ends thereof. The worm 2, which will be described later, is processed after the worm wheel 1 is supported to the supporting body 3.

The supporting body 3, composed of a housing made of aluminum, includes the first supporting sections 3a and 3a which are engagement holes formed on both sides of a cavity for accommodating the worm wheel 1, the second supporting sections 3b and 3b which are engagement holes formed on both sides of a cavity for accommodating the worm 2 and communicated with the cavity, and a motor mounting part 3c communicating with one end of the second supporting sections 3b and 3b, and the first supporting sections 3a and 3a and the second supporting sections 3b and 3b are conducted by machining.

Figure 5:
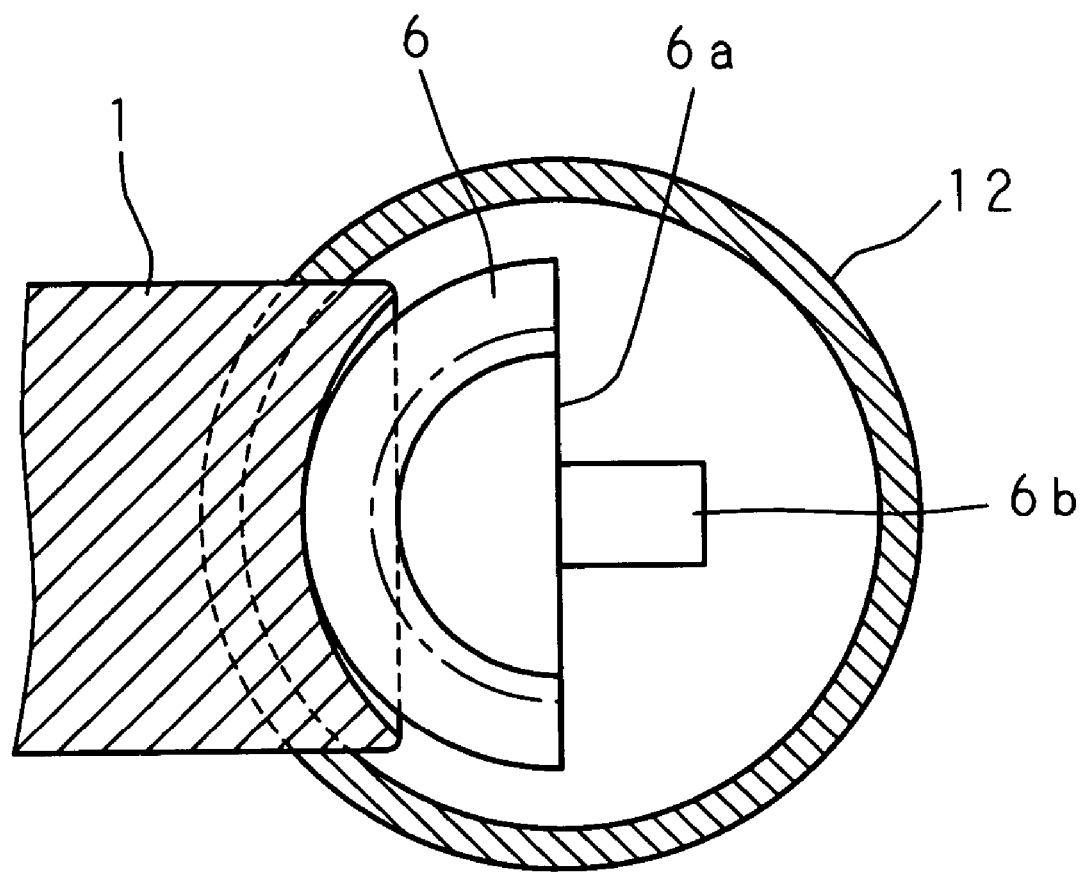
FIG. 5 is a sectional view of a jig gear section in the state shown in FIG. 4.

FIG. 4 is a sectional view showing a state of manufacture midstream of the manufacturing method of the gear device and FIG. 5 is a sectional view of a jig gear section in the state shown in FIG. 4. As described above, the gear device, including the worm wheel 1, the worm 2, and the supporting body 3, is manufactured so that a jig gear 6 corresponding to the worm 2 is preliminarily formed and one end of the jig gear 6 is fixed and supported to a support base 7. The support base 7 has a guide stria 7a provided on the side that the jig gear 6 is fixed and extended in the direction perpendicular to the axis line of the jig gear 6, a sensor base 7b protruded separately from the guide stria 7a, and a hook piece (not shown in the figure). A sliding body 8, having an engagement section 8a for engaging with the guide stria 7a and a through hole 8b in which the jig gear 6 is inserted, is sidably supported on the support base 7. A sensor 9 serving as measuring means for measuring a distance between the centers H of the worm wheel 1 and the jig gear 6 is mounted on the sensor base 7b.

The sensor 9 is composed of a differential transformer and connected to a controller 10 for controlling a numerically controlled gear cutter to be described later. The controller 10 is constituted of microprocessors, and includes means for predetermining a designed distance between the centers, means for calculating a difference of a distance between the centers of the distance between the centers measured by the measuring means and the designed distance between the centers, and control means for outputting a control signal to the numerically controlled gear cutter 11 based on the difference of the distance between the centers (a voltage value or current value) calculated by the means.

A biasing member (not shown in the figure), such as a coil spring for biasing the sliding body 8 in one direction, is provided between the sliding body 8 and the hook piece. A cylindrical positioning jig 12 fitted into the second supporting sections 3b and 3b of the supporting body 3 is coupled in the sliding body 8, thereby permitting the sliding body 8 and the positioning jig 12 to be integrally movable. The jig gear 6 is disposed in the positioning jig 12.

The jig gear 6 has a cut off part 6a to cut off a tooth body provided on one side thereof in a radial direction and, more particularly, provided on the side that the distance between the centers of the jig gear 6 and the worm wheel 1 is long, and a reinforcing convex stria 6b protruded on the cut off part 6a.

The gear device is manufactured in the following processes.

(1) The rotational shaft 4, which is engaged with and fixed into the worm wheel 1, is fitted into the rolling bearings 5a and 5b, and one rolling bearing 5a is fitted into the first supporting section 3a of the supporting body 3, thereby supporting the worm wheel 1 rotatably to the first supporting section 3a.

(2) The positioning jig 12, in which the jig gear 6 is disposed inside thereof, is fitted into the second supporting sections 3b and 3b of the supporting body 3 to determine the position of the supporting body 3 with respect to the jig gear 6. In this state, the motor mounting part 3c of the supporting body 3 is fixed to the positioning jig 12 with small screws or the like to integrally configure the supporting body 3, the positioning jig 12, and the sliding body 8.

(3) Biasing force of the above-mentioned biasing member is applied to the supporting body 3 via the sliding body 8 and the positioning jig 12 to bias the supporting body 3 toward the direction that the distance between the centers becomes short and engages the worm wheel 1 with the jig gear 6, whereby the backlash amount can be minimized and the sliding body 8 can touch the sensor 9.

(4) An intermediate product of the worm 2 is held by the numerically controlled gear cutter 11 so that the worm 2 is ready to be able to be processed automatically.

(5) The distance between the centers of the worm wheel 1 and the jig gear 6 is measured by the sensor 9.

(6) An instruction signal of a difference of a distance between the centers of a measured distance between the centers and a designed distance between the centers is given to the numerically controlled gear cutter 11 to conduct the target processing on the worm 2 so as to be the dimension of the distance between the centers. For example, when the measured distance between the centers is longer than the designed distance between the centers by +5 µm, an instruction signal that a distance between the centers becomes shorter than the designed distance between the centers by −5 µm is given to the numerically controlled gear cutter 11 to conduct the target processing on the worm 2 so that the measured distance between the centers becomes equal to the designed distance between the centers. Further, when the measured distance between the centers is shorter than the designed distance between the centers by −3 µm, an instruction signal that a distance between the centers becomes longer than the designed distance between the centers by +3 µm is given to the numerically controlled gear cutter 11 to conduct the target processing on the worm 2 so that the measured distance between the centers becomes equal to the designed distance between the centers.

(7) The support base 7 and the jig gear 6 are shifted toward the direction that the distance between the centers becomes long with respect to the supporting body 3, the positioning jig 12, and the sliding body 8 to release the engagement between the worm wheel 1 and the jig gear 6. In this case, since the cut off part 6a is provided on outer peripheral part of the jig gear 6, the jig gear 6 can be shifted without interfering with the positioning jig 12 and the engagement between the worm wheel 1 and the jig gear 6 can be easily released. Further, the supporting body 3 is removed from the positioning jig 12 to extract it.

(8) The shaft parts 2b and 2c of the worm 2 conducted by the target processing are fitted into the rolling bearings 13a and 13b and the rolling bearings 13a and 13b are fitted into the second supporting sections 3b and 3b of the supporting body 3, whereby the worm 2 can be rotatably supported to the second supporting sections 3b and 3b to engage the worm 2 with the worm wheel 1.

As described above, the gear device is manufactured as follows: the worm wheel 1 is incorporated in the supporting body 3; the jig gear 6 formed corresponding to the worm 2 is engaged with the worm wheel 1 to measure the distance between the centers; the worm 2 is conducted by the target processing based on the measured distance between the centers; and such a worm 2 is incorporated in the supporting body 3. Consequently, the number of measurements can be reduced compared to the case performed by the layered assembly, cumulative errors due to the measurement can be reduced, and the backlash amount and the torque between articles can become stable. Further, since the layered assembly is not conducted, stocks of products in process can be reduced. In addition, a process of incorporating the worm wheel 1 and the worm 2 in the supporting body 3, a process of measuring the distance between the centers, and a process of processing the worm 2 can be conducted in the same temperature environment, whereby measurement errors due to the atmospheric temperature can be reduced.

It is noted that, in the above described embodiments, the worm 2 serves as the second gear and the jig gear 6 corresponding to the worm 2 is used; however, as another case, the worm 2 serves as the first gear, the worm wheel 1 serves as the second gear, and a jig gear corresponding to the worm wheel 1 may be used.

Further, in the above described embodiments, the rolling bearings 5a, 5b, 13a, and 13b are used as means for supporting the worm wheel 1 and the worm 2 to the supporting body 3; however, as another case, bearings such as sliding bearings may be used.

Furthermore, the gear device is configured by including the worm wheel 1 serving as the first gear and the worm 2 serving as the second gear; however, other configurations including bevel gears, hypoid gears, helical gears, a pair of spur gears, and the like may be used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meters and bounds of the claims, or equivalence of such metes and bounds thereof are therefore intended to be embraced by the claims.

The invention claimed is:

1. A manufacturing method of a gear device which includes a first gear, a second gear for engaging with said first gear, and a supporting body having a first supporting section for rotatably supporting said first gear and a second supporting section for rotatably supporting said second gear, said method comprising:
   a supporting process of supporting said first gear in said first supporting section;
   an engaging process of engaging a jig gear which corresponds to said second gear with said first gear;
   a measuring process of measuring a distance between the centers of said first gear and said jig gear by a measurement section;
   a gear processing process of processing said second gear based on the distance between the centers measured by said measurement section; and
   a supporting process of supporting said second gear in said second supporting section after releasing the engagement between said first gear and said jig gear.

2. The manufacturing method of a gear device according to claim 1, wherein said jig gear has a cut off part to cut off a tooth body provided on one side thereof in a radial direction.

3. The manufacturing method of a gear device according to claim 2, wherein said cut off part is provided on a side that the distance between the centers is long.

4. The manufacturing method of a gear device according to claim 1, wherein said second gear is processed so that the measured distance between the centers becomes equal to a predetermined distance between the centers in said gear processing process.

5. The manufacturing method of a gear device according to claim 1, wherein said processes are conducted in the same temperature environment.

* * * * *